(12) United States Patent
Mun et al.

(10) Patent No.: US 8,625,052 B2
(45) Date of Patent: Jan. 7, 2014

(54) TRANSFLECTIVE DISPLAY APPARATUS

(75) Inventors: Yong-kweun Mun, Yongin-si (KR);
Hong-seok Lee, Seongnam-si (KR);
Yoon-sun Choi, Incheon (KR); Hoon Song, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 383 days.

(21) Appl. No.: 12/656,173

(22) Filed: Jan. 20, 2010

(65) Prior Publication Data
US 2010/0208169 A1     Aug. 19, 2010

(30) Foreign Application Priority Data
Feb. 19, 2009   (KR) .................. 10-2009-0013998

(51) Int. Cl.
*G02F 1/1335*   (2006.01)

(52) U.S. Cl.
USPC ............................................ 349/65; 349/106

(58) Field of Classification Search
None
See application file for complete search history.

(56) References Cited

U.S. PATENT DOCUMENTS

| 7,443,461 B2* | 10/2008 | Fukuda et al. ................ 349/64 |
| 2007/0242197 A1* | 10/2007 | Watson et al. ............... 349/114 |

FOREIGN PATENT DOCUMENTS

| JP | 2006-227408 | 8/2006 |
| KR | 10-2001-0046581 | 6/2001 |
| KR | 10-2003-0004062 | 1/2003 |
| KR | 10-2005-0079257 | 8/2005 |

* cited by examiner

*Primary Examiner* — Tina Wong
(74) *Attorney, Agent, or Firm* — Harness, Dickey & Pierce, P.L.C.

(57) ABSTRACT

Provided is a transflective display apparatus including a color reflective plate disposed at a light emitting surface of a light guide plate, and a display panel disposed at another surface of the light emitting surface of the light guide plate so that light emitted from a light source is reflected by a color reflective plate through the light guide plate and travels toward the display panel.

21 Claims, 6 Drawing Sheets

TRANSFLECTIVE DISPLAY APPARATUS

CROSS-REFERENCE TO RELATED APPLICATION

This application claims priority under 35 U.S.C. §119 to Korean Patent Application No. 10-2009-0013998, filed on Feb. 19, 2009, in the Korean Intellectual Property Office (KIPO), the entire contents of which are herein incorporated by reference.

BACKGROUND

1. Field

Example embodiments relate to a transflective display apparatus.

2. Description of the Related Art

Mobile devices, for example, mobile phones, personal digital assistants (PDAs), portable multimedia players (PMPs), and digital multimedia broadcasting (DMB) devices, have become widely used. These mobile devices have caused changes in lifestyles in view of their amount of use, application fields, and diverse contents. Mobile device displays have expanded to allow the display of web documents and video from a relatively simple information type display, for example, the display of sound and text.

In addition to displays of mobile devices, public information displays (PIDs) are leading a main outdoor billboard market owing to an emerging tendency toward video outdoor billboards instead of text based outdoor billboards. Outdoor visibility is a performance index for PIDs.

Transmittive display apparatuses or self-emission type display apparatuses with illumination of high luminance may be used to display a clear image in the bright outdoors. However, these display type apparatuses consume a relatively large amount of energy. Research into reflective type display apparatuses for displaying an image by using a peripheral light without additional energy consumption has been conducted, but the reflective type display apparatuses are inferior to the transmittive display apparatuses or self-emission type display apparatuses in terms of brightness and/or image quality.

A transflective display apparatus may use an external light and light of an embedded light source as image forming light. The external light is used to form an image in the bright outdoors, an inside light is used to form the image in a dark place, and both the external light and inside light are used to form the image in an environment of intermediate luminance, thereby forming an image having high visibility in any environment and reducing the amount of energy consumed by the embedded light source.

SUMMARY

Example embodiments include a transflective display apparatus having a new structure.

Additional aspects will be set forth in part in the description which follows and, in part, will be apparent from the description, or may be learned by practice of example embodiments.

In accordance with example embodiments, a transflective display apparatus may include a light source configured to emit backlight. The transflective display apparatus may also include a light guide plate configured to receive external light and allow the external light to pass through the light guide plate, and receive the backlight from the light source and guide the backlight to a light emitting surface of the light guide plate. The transflective display apparatus may further include a color reflective plate configured to receive the backlight and the external light from the light guide plate and reflect the backlight and the external light as colored backlight and colored external light to the light guide plate. In accordance with example embodiments, the transflective display apparatus may further include a display panel configured to receive the colored backlight and the colored external light from the light guide plate and modulate the colored backlight and the colored external light to form an image.

According to example embodiments, a transflective display apparatus may include a light source and a light guide plate guiding light emitted from the light source to a light emitting surface of the light guide plate. In accordance with example embodiments, light guided to the light emitting surface may be transmitted through the light guide plate to a color reflective plate configured to reflect the light emitted from the light emitting surface of the light guide plate to the light emitting surface of the light guide plate in a color light state. In accordance with example embodiments, the transflective display apparatus may further include a display panel modulating the light reflected by the color reflective plate and transmitted through the light guide plate to form an image.

In accordance with example embodiments, the light source may emit white light.

In accordance with example embodiments, the light source may sequentially emit a plurality of different single color lights.

In accordance with example embodiments, the light guide plate may include a light guide member reflecting the incident light into the inside of the light guide member, and a plurality of protrusions protruding from the light emitting surface of the light guide member and emitting light reflected in the inside of the light guide plate to the outside.

In accordance with example embodiments, the light guide member may be disposed to allow the plurality of protrusions to face the color reflective plate.

In accordance with example embodiments, the color reflective plate may be a transmissive color filter.

In accordance with example embodiments, the color reflective plate may include a color tunable photonic crystal plate or holographic polymer dispersed liquid crystal (HP-DLC).

In accordance with example embodiments, the color reflective plate may further include a light absorption plate absorbing the transmitted light.

In accordance with example embodiments, the color reflective plate may include the transmissive color filter and a reflective plate.

In accordance with example embodiments, the display panel may be a liquid crystal panel or a polymer dispersed liquid crystal (PDLC) panel.

BRIEF DESCRIPTION OF THE DRAWINGS

Example embodiments will be more clearly understood from the following detailed description taken in conjunction with the accompanying drawings. FIGS. 1-7 represent non-limiting, example embodiments as described herein.

FIG. 1 is a cross-sectional diagram schematically illustrating a transflective display apparatus according to example embodiments;

FIG. 3 is a cross-sectional diagram schematically illustrating a transflective display apparatus according to example embodiments;

FIG. 5 is a cross-sectional diagram schematically illustrating a transflective display apparatus according to example embodiments;

FIG. 6 is a cross-sectional diagram schematically illustrating a transflective display apparatus according to example embodiments; and FIG. 7 is a cross-sectional diagram schematically illustrating a transflective display apparatus according to example embodiments.

DETAILED DESCRIPTION

Figure 1:
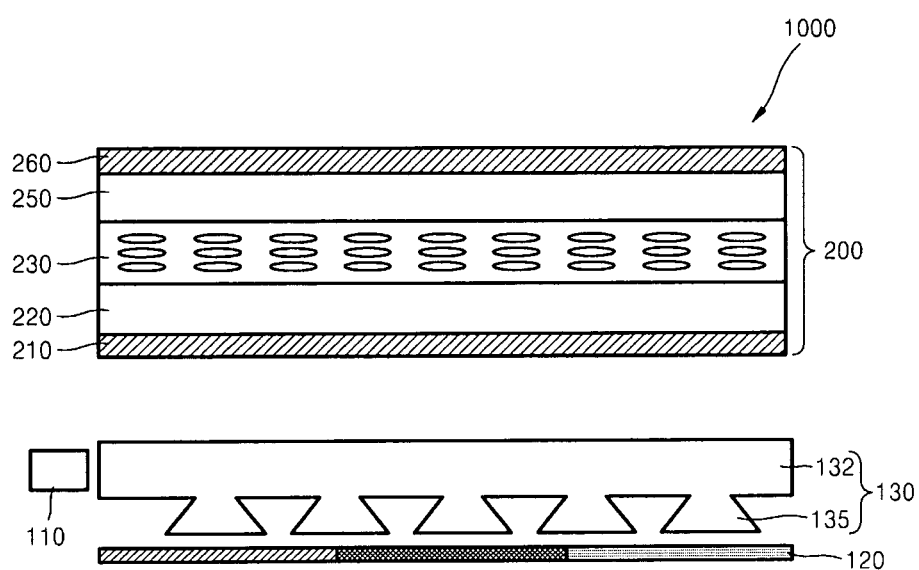

Example embodiments will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Reference will now be made to example embodiments which are illustrated in the accompanying drawings, wherein like reference numerals refer to like elements throughout, and the sizes and thicknesses of layers and areas are exaggerated for clarity. In this regard, example embodiments may have different forms and should not be construed as being limited to the descriptions set forth herein. Accordingly, example embodiments are merely described below, by referring to the figures, to explain various aspects of example embodiments.

FIG. 1 is a side cross-sectional diagram schematically illustrating a transflective display apparatus 1000 according to example embodiments. Referring to FIG. 1, the example transflective display apparatus 1000 includes a backlight unit and a display panel 200. The backlight unit includes a light source 110, an all-in-one light guide plate 130, and a color reflective plate 120.

As shown in FIG. 1, the light source 110 may be disposed at one side of the all-in-one type light guide plate 130. The light source 110 may emit a white light. A point source, for example, a light emitting diode (LED), or a line source, for example, a cold cathode fluorescent lamp (CCFL), may be used as the light source 110. In addition, a plurality of point sources may be used or members for converting a point source into a line source may be used along with the point sources.

The example transflective display apparatus 1000 according to example embodiments may use light of the backlight unit and external light as image forming light. As shown in FIG. 1, an all-in-one light guide plate 130, according to example embodiments, includes a light guide portion 132 and a portion that includes protrusions 135 that protrude from the light guide portion 132. The light guide portion 132 may be configured to propagate light incident from the light source 110 to the inside of the all-in-one light guide plate 130. A refractive index of a material of the light guide portion 132 may be greater than the refractive index of an external environment, for example, air. Thus, most of the light emitted from the light source 110 and incident into the light guide portion 132 may be reflected in the light guide portion 132. Although most of the light in the light guide portion 132 is reflected within the light guide portion 132, some of the light will escape the light guide plate 130 via the protrusion portions 135. For example, light propagating in the light guide portion 132 and to the protrusion portions 135 may not meet the condition of a total reflection, accordingly, the protrusion portions 135 may emit the light that is reflected by the light guide portion 132 to the outside. In more detail, a surface of the all-in-one light guide plate 130 where the protrusion portions 135 are formed is a light emission surface with respect to the light that is propagated in the light guide portion 132. Most of light that is incident from the upper and lower surfaces of the light guide plate 130 is transmitted through the all-in-one light guide plate 130.

The light guide portion 132 and the protrusion portions 135 may be integrally formed with no optical boundary therebetween. For example, the all-in-one light guide plate 130 may be integrally manufactured by embossing the forms of the protrusions 135 on one surface of the light guide portion 132. In the alternative, the light guide portion 132 and the protrusion portions 135 may be separately manufactured and may be united with each other without an optical boundary therebetween. In the event the light guide portion 132 and the protrusions 135 are united with each other, the light guide portion 132 and the protrusion portions 135 may be formed of the same material or may be formed of different materials. If the light guide portion 132 and the protrusion portions 135 are formed of different materials, the light guide portion 132 and the protrusion portions 135 may be selected from materials so that a refractive index of the protrusions 135 is the same as or greater than the refractive index of the light guide portion 132 in order to reduce a reflection on a boundary surface between the light guide portion 132 and the protrusion portions 135.

As shown in FIG. 1, the area of the ends of the protrusions 135 may be greater than the sectional area of a surface of the protrusions 135 that contacts the light guide portion 132. The forms and/or distributions of the protrusions 135 are not limited thereto. The forms of the protrusions 135 may be configured to emit the light incident from the light source 110 disposed on the side surface of the light guide portion 132 to the outside. For example, the protrusions 135 may have denser distributions as the protrusions 135 are farther from the light source 110 so that the light emitted from the all-in-one light guide plate 130 has uniform or nearly uniform brightness. In more detail, the number of the protrusions 135 formed far away from the light source 110 may be greater than the number of the protrusions 135 formed close to the light source 110. Also, the farther from the light source 110 the protrusions 135, the greater the size of the protrusions 135. The sectional shapes of the protrusions 135 are not limited to inverse trapezoidal shapes shown in FIG. 1. The forms or distributions of the protrusions 135 may be determined based on the type of the light source 110. For example, when a point source such as an LED is used as the light source 110, the upper surfaces of the protrusions 135 may be circular-shaped so as to obtain circular-shaped light emission angular distributions. The all-in-one light guide plate 130 may be formed of a relatively transparent material and may be formed of, for example, polydimethylsiloxane, which is relatively transparent and relatively flexible.

As shown in FIG. 1, the color reflective plate 120 is disposed at the side of the surface of the all-in-one light guide plate 130 where the protrusions 135 are formed. A reflective color filter may be used as the color reflective plate 120. The color reflective plate 120 may have, for example, a structure in which single color filters of red, green, and blue corresponding to each pixel of the display panel 200 are arranged. For example, the color reflective plate 120 may be formed by regularly arranging red, green, and blue dyes on a mirror surface.

The light that is propagated in the light guide portion 132 from the light source 110 may be emitted through the protrusions 135, as described above, and to the color reflective plate 120. The color reflective plate 120 may reflect the light emitted through the protrusions 135 back toward the protrusions 135 in a color light state. Also, the color reflective plate 120 may reflect external light that passes through the all-in-one light guide plate 130 from the display panel 200. In example embodiments, external light may pass through the display panel 200 and through the guide plate 130 and to the color reflective plate 120 via the protrusions 135. The color reflective plate 120 may reflect the external light toward the all-in-one light guide plate 130 in a color light state and to the display panel 200. The light reflected by the color reflective plate 120 is incident into the display panel 200 through the all-in-one light guide plate 130 in a red light state, green light, or blue light. Therefore, as will be described later, the color filters of red, green, and blue may not be required in the display panel 200.

The display panel 200 modulates light emitted from the all-in-one light guide plate 130 and forms an image. FIG. 1 illustrates an example of a display panel that includes a liquid crystal panel. As shown in FIG. 1, the example display panel 200 includes first and second substrates 220 and 250 and a liquid crystal layer 230 disposed between the first and second substrates 220 and 250. The first and second substrates 220 and 250 may be relatively transparent substrates and may employ glass substrates. First and second polarizers 210 and 260 may be disposed on the external surfaces of the first and second substrates 220 and 250, respectively, and polarization axes of the first and second polarizers 210 and 260 may be perpendicular to each other. Although not shown, the display panel 200 may further include a pixel electrode and a thin film transistor (TFT) layer which may correspond to each pixel and may control the liquid crystal layer 230. As described above, single color filters corresponding to each pixel of the display panel 200 may be arranged. In example embodiments, the backlight unit illuminates color light of each pixel, and the display panel 200 adjusts gradation of the color light, so that the transflective display apparatus 1000 displays an image. Although a color display panel usually includes a color filter, because the backlight unit illuminates the color light corresponding to each pixel in the display panel 200 of example embodiments, the display panel 200 does not require a color filter.

Although not shown, a diffusion plate may be further disposed between the all-in-one light guide plate 130 and the display panel 200. The diffusion plate may prevent the image formed on the display panel 200 from being reflected by the color reflective plate 120 and being diffused as a double layered image.

Figure 2A:
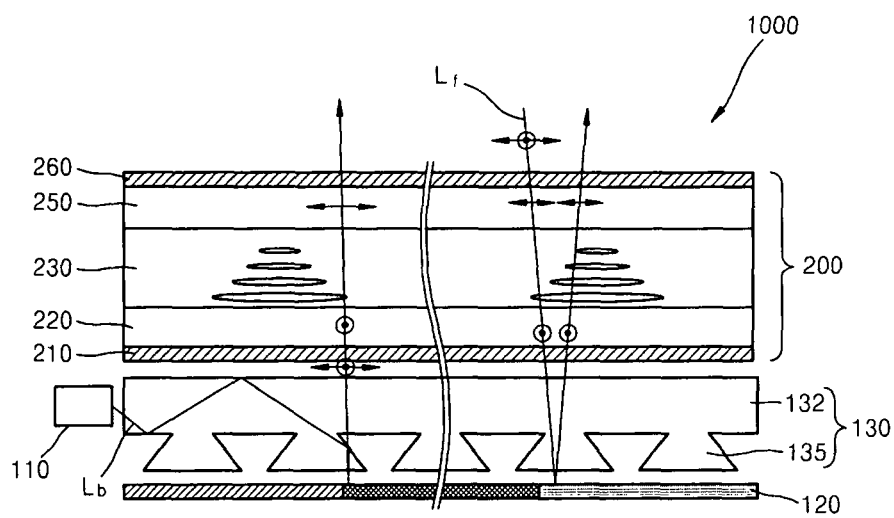
FIGS. 2A and 2B are cross-sectional diagrams illustrating the transflective display apparatus shown in FIG. 1 that on/off modulates a backlight and an external light according to example embodiments.
Figure 2B:
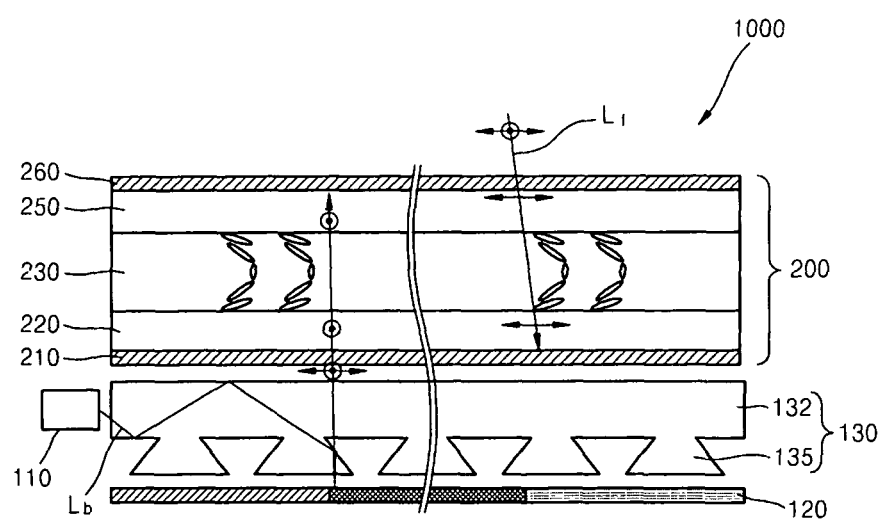

FIGS. 2A and 2B are cross-sectional diagrams illustrating the example transflective display apparatus 1000 that on/off modulates a backlight Lb and an external light Lf.

Referring to FIG. 2A, the backlight Lb, which is incident into the all-in-one light guide plate 130 from the light source 110 and is emitted from the protrusions 135, is reflected by the color reflective plate 120 which has colors corresponding to single colors of positions where the backlight Lb is reflected. The color lights corresponding to the arrangement of pixels of the display panel 200 may be a two-dimensional arrangement of, for example, red light, green light, and blue light. The light reflected by the color reflective plate 120 is incident into the display panel 200 through the all-in-one light guide plate 130. The first polarizer 210 changes a polarization of the backlight Lb incident into the display panel 200 into a first polarization. When an electric field is not applied to the liquid crystal layer 230, the polarization of the backlight Lb incident into the display panel 200 is changed into a second polarization that is perpendicular to the first polarization through the liquid crystal layer 230. The backlight Lb in a second polarization state is transmitted through the second polarizer 260 through which light of the second polarization in perpendicular to the first polarization is transmitted, and forms a pixel on state. The backlight Lb passing through each pixel of the display panel 200 are single color lights, for example, red light, green light, and blue light, that are reflected by the color reflective plate 120, and may express colors by using a combination of single color lights.

The external light Lf that is incident from the front surface of the display panel 200 is also contributed as light for forming an image. The external light Lf passes through the second polarizer 260 and thus a polarization of the external light Lf is changed into the second polarization. Thereafter, because the external light Lf passes through the liquid crystal layer 230 to which the electric field is not applied and thus the polarization of the external light Lf is changed into the first polarization, the external light Lf is transmitted through the first polarizer 210 through which the light of the first polarization is transmitted. Thereafter, the external light Lf is incident into the all-in-one light guide plate 130, is reflected by the color reflective plate 120, and travels toward the display panel 200 through the all-in-one light guide plate 130. When the external light Lf is reflected by the color reflective plate 120, the external light Lf has colors corresponding to single colors of positions where the external light Lf is reflected. Although the external light Lf that is reflected by the color reflective plate 120 may have a second polarization component, in addition to the first polarization component, the external light Lf is incident into the first polarizer 210 again and enters into the first polarization state. The light that is incident into the first polarizer 210 again enters into the second polarization state through the liquid crystal layer 230, is transmitted through the second polarizer 260, and forms the pixel on state indicating a color corresponding to each single color filter of the color reflective plate 120.

Referring to FIG. 2B, an electric field may be applied to the liquid crystal layer 230 and thus liquid crystal may be arranged in a direction of the electric field. Thus, a polarization of light that is transmitted through the liquid crystal layer 230 may not change. The backlight Lb, which is incident into the all-in-one light guide plate 130 from the light source 110 and is emitted from the protrusions 135, is reflected by the color reflective plate 120 and has colors corresponding to single colors of positions where the backlight Lb is reflected. The light reflected by the color reflective plate 120 is incident into the display panel 200 through the all-in-one light guide plate 130. The first polarizer 210 changes the backlight Lb incident into the display panel 200 into light of the first polarization. The backlight Lb passes through the liquid crystal layer 230 and maintains the first polarization state. Thus, the backlight Lb is not transmitted through the second polarizer 260 through which light of the second polarization is transmitted and forms a pixel off state. The external light Lf passes through the second polarizer 260, is changed into light of the second polarization, passes through the liquid crystal layer 230, and maintains the second polarization state, so that the external light Lf is absorbed in the first polarizer 210 and forms the pixel off state.

As described above, the transflective display apparatus 1000 of example embodiments includes a display panel 200 to which backlight Lb from the light source 110 and external light Lf from an external light source are directed. The backlight Lb and the external light Lf may be reflected from a color reflective plate 120 and to the display panel 200 via an all-in-one light guide plate 130. In example embodiments the backlight Lb and the external light Lf may be used as light for forming an image, which achieves relatively high brightness and relatively low power consumption, compared to a reflective display apparatus that uses an external light incident from a display surface or a transflective display apparatus that divides a liquid crystal cell region into a reflective region and a transmittive region.

Figure 3:
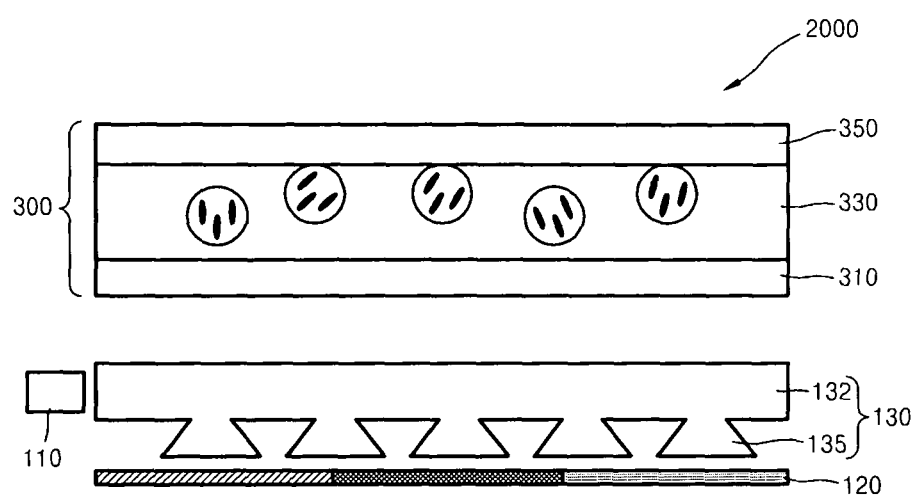

FIG. 3 is a cross-sectional diagram schematically illustrating a transflective display apparatus 2000 according to example embodiments.

Referring to FIG. 3, the example transflective display apparatus 2000 includes a backlight unit and a display panel 300. The backlight unit includes the light source 110, the all-in-one light guide plate 130, and the color reflective plate 120. The backlight unit illustrated in FIG. 3 is the same as the backlight unit of the example transflective display apparatus 1000 illustrated in FIG. 1.

The example display panel 300 illustrated in FIG. 3 employs a polymer dispersed liquid crystal (PDLC) panel. The example display panel 300 employs the PDLC panel which is different from the display panel 200 described with reference to FIG. 1.

The example display panel 300 according to example embodiments is disposed between first and second substrates 310 and 350 and includes a PDLC layer 330 formed by mixing a black dye into PDLC. When an electric field is not applied to the PDLC, the PDLC diffuses incident light by a difference in a dielectric constant between polymer and liquid crystal. When the electric field is applied to the PDLC, the PDLC is transparent due to a small difference in the dielectric constant between polymer and liquid crystal that are arranged along the electric field and the incident light is transmitted. The PDLC mixed with the black dye diffuses the incident light when an electric field is not applied to the PDLC because the PDLC absorbs the incident light due to the black dye. However, the incident light may be transmitted through the PDLC when an electric field is applied. Thus, the display panel 300 realizes on/off of each pixel. In this regard, since the display panel 300 does not use a polarization of the incident light, the display panel 300 does not need a polarization plate, unlike general liquid crystal panels. Although not shown, the display panel 300 may further include a pixel electrode, and a TFT layer that correspond to each pixel and control the PDLC layer 330. Single color filters corresponding to each pixel of the display panel 300 are arranged.

Figure 4A:
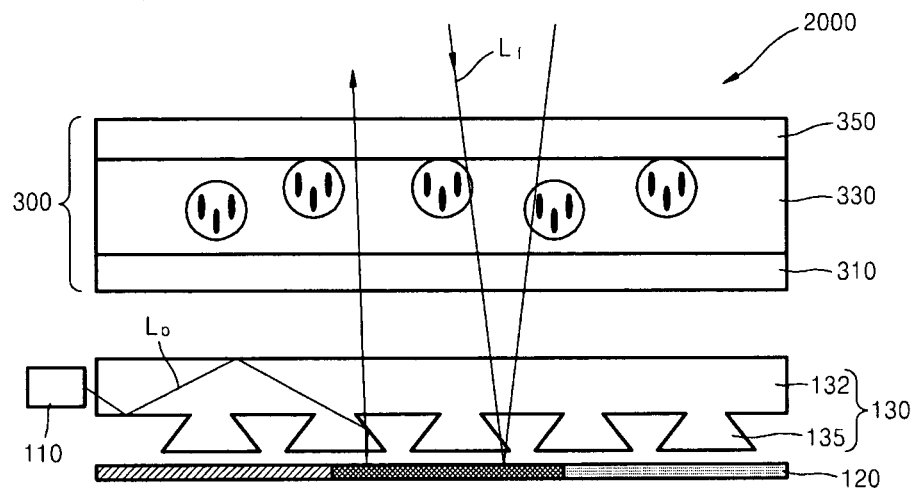
FIGS. 4A and 4B are cross-sectional diagrams illustrating the transflective display apparatus shown in FIG. 3 that on/off modulates a backlight and an external light according to example embodiments.
Figure 4B:
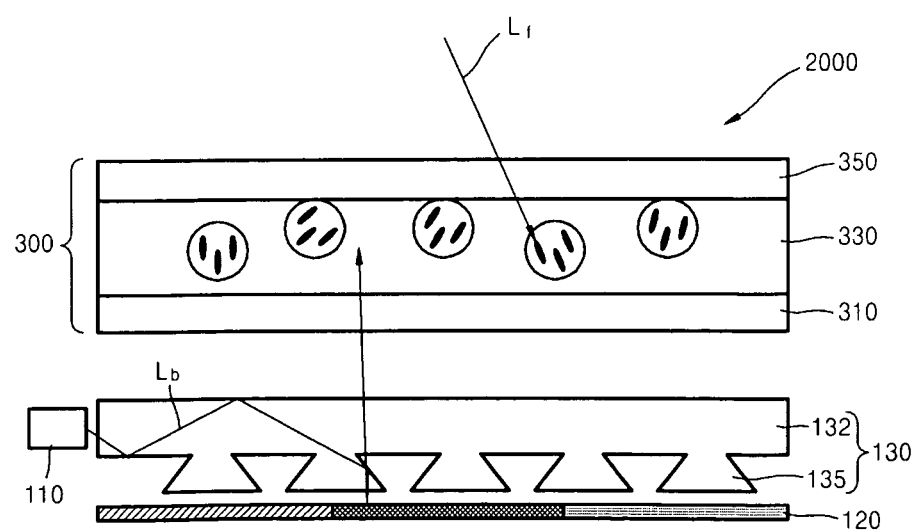

FIGS. 4A and 4B are cross-sectional diagrams illustrating the transflective display apparatus 2000 that on/off modulates the backlight Lb and the external light Lf according to example embodiments.

Referring to FIG. 4A, a voltage may be applied to the PDLC layer 330 and thus liquid crystal are arranged. In this case, the PDLC is in a transparent state in which light is transmitted due to a small difference in the dielectric constant between liquid crystal and polymer. The backlight Lb, which is incident into the all-in-one light guide plate 130 from the light source 110 and is emitted from the protrusions 135, is reflected by the color reflective plate 120 and has colors corresponding to single colors of positions where the backlight Lb is reflected. The light reflected by the color reflective plate 120 is incident into the display panel 300 through the all-in-one light guide plate 130. The backlight Lb incident into the display panel 300 is transmitted through the PDLC layer 330 of the transparent state and forms a pixel on state indicating a color corresponding to each single color filter of the color reflective plate 120. The external light Lf incident from the front surface of the display panel 300 passes through the PDLC layer 330 of the transparent state, is reflected by the color reflective plate 120, and has the color corresponding to each single color filter of the color reflective plate 120. The external light Lf reflected by the color reflective plate 120 travels toward the display panel 300 through the all-in-one light guide plate 130. The external light Lf incident into the display panel 300 again is transmitted through the PDLC layer 330 of the transparent state and forms the pixel on state indicating the color corresponding to each single color filter of the color reflective plate 120.

Referring to FIG. 4B, when a voltage is not applied to the PDLC layer 330 the liquid crystals are not arranged. With no voltage being applied, the PDLC is in a light diffusion state due to a difference in the dielectric constant between liquid crystal and polymer. The diffused light is absorbed by the black dye mixed into the PDLC. The backlight Lb, which is incident into the all-in-one light guide plate 130 from the light source 110 and is emitted from the protrusions 135, is reflected by the color reflective plate 120 and has colors corresponding to single colors of positions where the backlight Lb is reflected. The light reflected by the color reflective plate 120 is incident into the display panel 300 through the all-in-one light guide plate 130. However, the backlight Lb incident into the display panel 300 is not transmitted through the PDLC layer 330 of a light absorption state and forms a pixel off state. Also, the external light Lf is absorbed in the PDLC layer 330 and forms the pixel off state.

The transflective display apparatuses 1000 and 2000 described with reference to FIGS. 1 through 4B include the all-in-one light guide plate 130 that emits the backlight Lb from the light source 110 to the display panels 200 and 300. The transflective display apparatuses 1000 and 2000 may also be configured to use external light Lf incident from the front surface of the display panels 200 and 300 for forming an image. Accordingly, example embodiments of the transflective display apparatuses 1000 and 200 may use the backlight Lb and the external light Lf for forming an image, as a transflective structure. For example, the display panels 200 and 300 may be an electrochromic display panel, an electro-wetting display panel, an electrophoretic display panel, and a micro electro mechanical system (MEMS) shutter. For example, the electrophoretic display panel may be a light modulation element that uses an electrophoretic display element formed of a material that modulates a color by using electrons or holes. The electro-wetting display panel may be a light modulation element that uses a liquid crystal material that equally spreads or focuses a surface tension of an interface due to charges existing on the interface.

Figure 5:
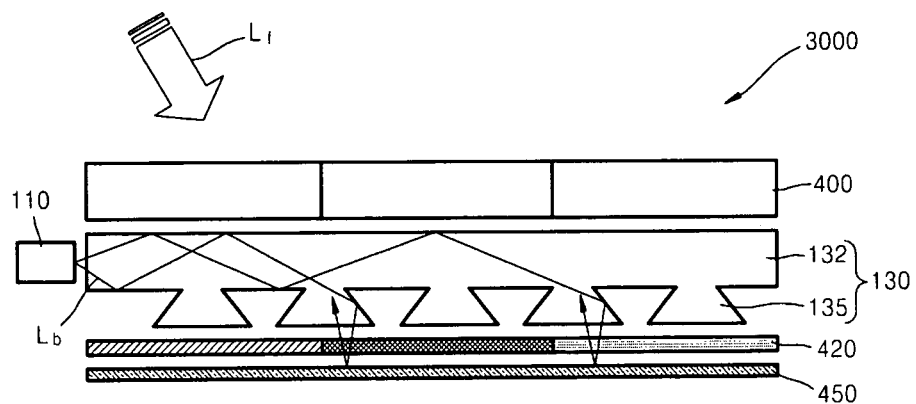

FIG. 5 is a cross-sectional diagram schematically illustrating a transflective display apparatus 3000 according to example embodiments.

Referring to FIG. 5, the example transflective display apparatus 3000 includes a backlight unit and a display panel 400. The backlight unit includes the light source 110, the all-in-one light guide plate 130, a transmissive color filter 420, and a reflective plate 450. The transflective display apparatus 3000, which includes the transmissive color filter 420 and the reflective plate 450, is different from the example transflective display apparatus 1000 described with reference to FIG. 1. The transmissive color filter 420 has, for example, a structure in which single color filters of red, green, and blue corresponding to each pixel of the display panel 420 are arranged. For example, the transmissive color filter 420 may be formed by regularly arranging red, green, and blue dyes on a transparent sheet.

As described above, the display panel may be a transmittive light modulation element, for example, a liquid crystal panel, a PDLC panel, an electrochromic display panel, an electro-wetting display panel, an electrophoretic display panel, and an MEMS shutter. The example transflective display apparatus 3000 illustrated in FIG. 5 may form an image by using light of the backlight unit and an external light in the same manner as described with reference to FIGS. 2A and 2B.

Figure 6:
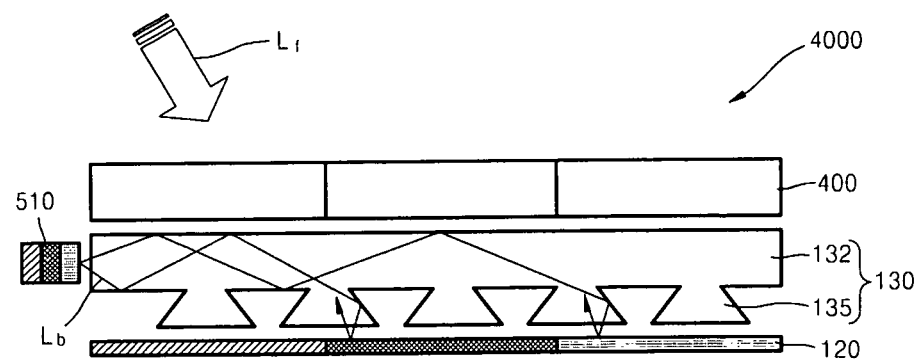

FIG. 6 is a cross-sectional diagram schematically illustrating a transflective display apparatus 4000 according to example embodiments.

Referring to FIG. 6, the example transflective display apparatus 4000 includes a backlight unit and the display panel 400. The backlight unit includes a light source 510, the all-in-one light guide plate 130, and the color reflective plate 120. The example transflective display apparatus 4000 illustrated in FIG. 6, includes a light source 510 that is different from the transflective display apparatus 1000 described with reference to FIG. 1. The light source 510, for example, may sequentially emit different single color light. The light source 510 may include a set of red light source, green light source, and blue light source. The light source 510 may further include white light source or different single light source. The light source 510, for example, may sequentially emit the red light source, the green light source, and the blue light source. In example embodiments, because the color reflective plate 120 reflects light of illuminated color light, one of the red light source, the green light source, and the blue light source may be incident into the example transflective display apparatus 4000. The example transflective display apparatus 4000 may time-sequentially illuminate color, thereby preventing or reducing color crosstalk between pixels.

Figure 7:
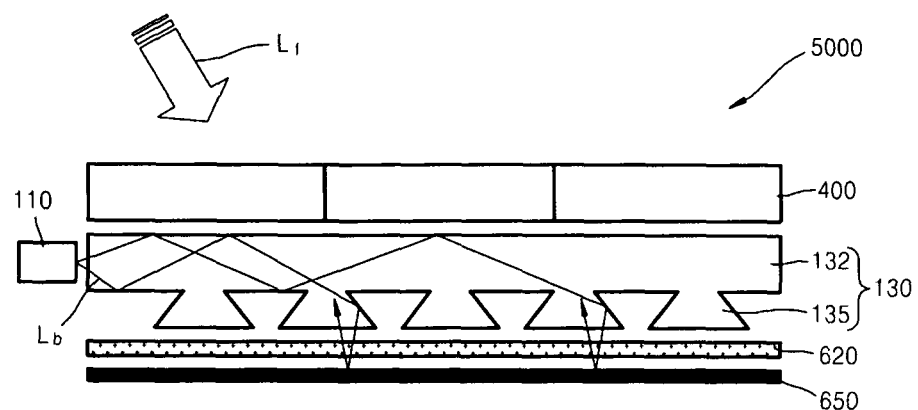

FIG. 7 is a cross-sectional diagram schematically illustrating an example transflective display apparatus 5000 according to example embodiments.

Referring to FIG. 7, the example transflective display apparatus 5000 includes a backlight unit and the display panel 400. The backlight unit includes the light source 110, the all-in-one light guide plate 130, and a color tunable photonic crystal plate 620. The example transflective display apparatus 5000 may further include a light absorption plate 650 that absorbs transmitted light on the rear surface of the color tunable photonic crystal plate 620. The color tunable photonic crystal plate 620 may be an example of a color tunable color reflective plate. The example transflective display apparatus 5000 illustrated in FIG. 7, which includes the color tunable photonic crystal plate 620 and the light absorption plate 650, is different from the example transflective display apparatus 1000 described with reference to FIG. 1. The color tunable photonic crystal plate 620 may be formed by stacking photonic crystals having an electro-optic properties in which a refractive index varies according to an application of a voltage. A photonic crystal usable with example embodiments includes, for example, Lithium Niobate LiNbO3 (hereinafter referred to as "LiNbO") and Potassium-Tantalum-Niobium K—Ta—Nb (hereinafter, referred to as "KTN). In a general multi-layer structure in which layers having different refractive indices are stacked, a wavelength range of reflected light varies according to the thickness and refractive index of each layer. The color tunable photonic crystal plate 620 may apply a voltage which may change the refractive index of each layer, thereby adjusting the wavelength range of reflected light. For example, the color tunable photonic crystal plate 620 may be designed to adjust the wavelength range of light reflected in the order of red, green, and blue. The backlight Lb emitted from the light source 110 or the external light Lf may be reflected by the color tunable photonic crystal plate 620 and have red, green, and blue. Therefore, the backlight unit may time-sequentially illuminate the red, green, and blue light by using the color tunable photonic crystal plate 620 and the display panel 400 forms an image of a corresponding color, thereby realizing a color.

The color tunable photonic crystal 620 may be holographic polymer dispersed liquid crystal (HPDLC). Although the HPDLC may be similar to the PDLC described above, the HPDLC that forms an interference pattern when distributing liquid crystal in a polymer medium is different from the PDLC. If white light is incident in an off state where an external electric field is not applied to the HPDLC, the HPDLC may selectively reflect light having a wavelength corresponding to a Bragg gap while reducing diffusion of an undesired light according to the Bragg law. The reflected wavelength may be adjusted by changing a refractive index of liquid crystal molecules. Thus, the HPDLC may be used as the color tunable photonic crystal 620 to time-sequentially reflect the red, green, and blue light.

While example embodiments have been particularly shown and described with reference to example embodiments thereof, it will be understood by those of ordinary skill in the art that various changes in form and details may be made therein without departing from the spirit and scope of the following claims.

What is claimed is:

1. A transflective display apparatus comprising:
   a light source configured to emit backlight;
   a light guide plate configured to
      receive external light and allow the external light to pass through the light guide plate, and
      receive the backlight from the light source and guide the backlight to a light emitting surface of the light guide plate;
   a color reflective plate configured to receive the backlight and the external light from the light guide plate and reflect the backlight and the external light as colored backlight and colored external light to the light guide plate; and
   a display panel configured to receive the colored backlight and the colored external light from the light guide plate and modulate the colored backlight and the colored external light to form an image.

2. The apparatus of claim 1, wherein the backlight is white light.

3. The apparatus of claim 1, wherein the light source sequentially emits a plurality of different single color lights.

4. The apparatus of claim 1, wherein the light guide plate includes
   a light guide portion configured to reflect the backlight light in the light guide plate, and
   a plurality of protrusions protruding from the light guide portion, the plurality of protrusions being configured to emit the backlight reflected in the light guide plate out of the light guide plate.

5. The apparatus of claim 1, wherein the plurality of protrusions faces the color reflective plate.

6. The apparatus of claim 1, wherein the color reflective plate is a transmissive color filter.

7. The apparatus of claim 1, wherein the color reflective plate includes one of a color tunable photonic crystal plate and a holographic polymer dispersed liquid crystal (HP-DLC).

8. The apparatus of claim 7, wherein the color reflective plate further includes a light absorption plate configured to absorb the backlight emitted from the emitting surface of the light guide plate.

9. The apparatus of claim 1, wherein the color reflective plate includes a transmissive color filter and a reflective plate.

10. The apparatus of claim 1, wherein the display panel is one of a liquid crystal panel and a polymer dispersed liquid crystal (PDLC) panel.

11. The apparatus of claim 4, wherein a refractive index of the plurality of protrusions is greater than the refractive index of the light guide.

12. The apparatus of claim 4, wherein the plurality of protrusions is densely distributed as the plurality of protrusions are farther from the light source.

13. The apparatus of claim 4, wherein a number of the protrusions farther away from the light source is greater than a number of the protrusions close to the light source.

14. The apparatus of claim 4, wherein a cross-sectional area of each of the protrusions along a length direction of the light guide plate increases according to a distance from the light source.

15. The apparatus of claim 4, wherein the light guide plate is between the display panel and the color reflective plate.

16. The apparatus of claim 4, wherein each of the plurality of protrusions has a trapezoidal shape.

17. The apparatus of claim 4, wherein the plurality of protrusions includes a first cross-section and a second cross-section, the first cross-section adjoining the light guide portion and the second section facing the color reflective plate, the first and second cross-sections being circular-shaped.

18. The apparatus of claim 4, wherein the plurality of protrusions includes a first cross-section and a second cross-section, the first cross-section adjoining the light guide portion and the second section facing the color reflective plate, the second cross-section being larger than the first cross-section.

19. The apparatus of claim 1, wherein the light source is configured to sequentially emit different single color lights.

20. The apparatus of claim 1, wherein the light guide plate is substantially transparent.

21. The apparatus of claim 7, wherein the color tunable photonic crystal plate is configured to have different refractive indices according to an applied voltage.

* * * * *